US012398643B2

(12) United States Patent
Han et al.

(10) Patent No.: US 12,398,643 B2
(45) Date of Patent: Aug. 26, 2025

(54) PULSATING PNEUMATIC MOTOR

(71) Applicant: Northwest Institute of Eco-Environment and Resources, Chinese Academy of Sciences, Lanzhou (CN)

(72) Inventors: Haidong Han, Lanzhou (CN); Donghui Shangguan, Lanzhou (CN)

(*) Notice: Subject to any disclaimer, the term of this patent is extended or adjusted under 35 U.S.C. 154(b) by 0 days.

(21) Appl. No.: 18/770,667

(22) Filed: Jul. 12, 2024

(65) Prior Publication Data

US 2024/0360763 A1 Oct. 31, 2024

(30) Foreign Application Priority Data

May 24, 2024 (CN) .......................... 20241065573.9

(51) Int. Cl.
*F01D 1/34* (2006.01)
*F01B 19/04* (2006.01)
*F01D 25/16* (2006.01)

(52) U.S. Cl.
CPC ............... *F01D 1/34* (2013.01); *F01B 19/04* (2013.01); *F01D 25/162* (2013.01); *F05D 2210/12* (2013.01); *F05D 2260/30* (2013.01)

(58) Field of Classification Search
CPC .. F01B 19/00; F01B 19/04; F01D 1/30; F01D 1/32; F01D 1/34
See application file for complete search history.

(56) References Cited

U.S. PATENT DOCUMENTS 2,454,428 A * 11/1948 Amel ........................ F01D 1/30 415/154.1
2024/0360763 A1* 10/2024 Han ..................... F01D 25/162

* cited by examiner

*Primary Examiner* — Christopher R Legendre
(74) *Attorney, Agent, or Firm* — Addison D. Ault; IPGentleman Intellectual Property Services, LLC

(57) ABSTRACT

A pulsating pneumatic motor, comprising a housing, an output shaft and a rotor assembly wherein the rotor assembly includes: a plurality of cantilevers (2); a plurality of roller sets, each of which comprises a pair of rollers arranged on one said cantilever (2) in one-to-one correspondence, wherein each roller set comprises a fixed roller (3) and a movable roller (4); a plurality of elastic members (6), each connected between one movable roller (4) and one cantilever (2); an air pipe (5), passing through the plurality of roller sets in sequence, wherein the fixed roller (3) and the movable roller (4) of each of the roller sets are respectively in contact with the air pipe (5). The present disclosure can prevent the problem of air leakage, and avoid the mechanical energy loss caused by the friction, thereby improving the work conversion efficiency of the pneumatic motor.

10 Claims, 14 Drawing Sheets

PULSATING PNEUMATIC MOTOR

CROSS-REFERENCE TO RELATED APPLICATION

This application claims priority to Chinese Patent Application No. 202410655739.X, filed on May 24, 2024 before the China National Intellectual Property Administration, the disclosure of which is incorporated herein by reference in entirety.

TECHNICAL FIELD

The present disclosure relates to the field of motor technology, and in particular to a pulsating pneumatic motor.

BACKGROUND

Pneumatic motors are divided into vane-type pneumatic motors, piston-type pneumatic motors, gear-type pneumatic motors, etc. according to their structures. The vane-type pneumatic motor is mainly composed of an eccentrically mounted shaft, a stator, multiple blades embedded on the shaft, and a housing. Compressed air enters the chamber between the blades from the air inlet; its working principle is to use the difference in effective area and pressure generated by the compressed air before and after the chamber between the blades, to push and rotate the blades in the direction of increasing chamber space to achieve power output. As the chamber between the blades increases, the air does work through expansion and the pressure of the air decreases. After the blades sweep across the air outlet, this part of the air completes the work and is discharged. Multiple adjacent blade chambers repeat this process continuously, resulting in continuous power output. The gear-type pneumatic motor is mainly composed of a pair of meshing gears and a housing. The meshing gears isolate the motor intake end from the exhaust end in an airtight manner. Compressed air enters the chamber from the intake end and pushes the gears to rotate in opposite directions. The compressed air is continuously transferred to the exhaust end through the movement of the tooth grooves, expands and loses pressure until it is discharged, thereby completing continuous power output.

The chambers of the vane-type pneumatic motor must be airtight through the moving contact between the stator and the blades, and the gear-type pneumatic motor must be airtight through the meshing of the rotating gears. However, there is a certain degree of air leakage between the chambers during the operation of the motor, resulting in low power output conversion efficiency of the vane-type and gear-type pneumatic motors.

For piston-type pneumatic motors, multiple independent piston-type motors in a star-shaped layout are usually linked to work, and the air distribution valve installed at the air inlet automatically controls the intake and exhaust of each motor. A single piston-type motor consists of a motor housing, a piston, a piston ring, a connecting rod, a bearing, a return spring and other parts, and realizes power output through three processes: intake, expansion to work, and return and exhaust. However, during the operation of the piston-type motor, the mechanical energy loss caused by the friction between the piston and the motor housing is large, resulting in low power output conversion efficiency.

In summary, the existing vane-type and gear-type pneumatic motors have air leakage when working, so that part of the energy of the compressed air is wasted and cannot be converted into mechanical energy, and the piston-type pneumatic motor has friction when working, so that part of the mechanical energy converted from the energy of the compressed air needs to overcome friction to do work. Therefore, when existing pneumatic motors perform power output conversion, part of the energy of the compressed air cannot be converted and output due to its own air leakage or the need to overcome friction to do work, resulting in a low power output conversion efficiency of the pneumatic motor.

SUMMARY

In view of the foregoing, the present disclosure provides a pulsating pneumatic motor, which can avoid mechanical energy loss caused by pneumatic motor air leakage and friction, and improve the work conversion efficiency of the pneumatic motor, and thereby solve the problems in the prior art.

The technical solutions of the present disclosure are as follows: A pulsating pneumatic motor, comprising a housing and an output shaft disposed in the housing, wherein both ends of the output shaft are rotatably connected to the housing, and wherein the pulsating pneumatic motor further comprises a rotor assembly connected to the output shaft, wherein the rotor assembly comprises:

- a plurality of cantilevers, which are radially and evenly spaced and fixedly connected to the output shaft;
- a plurality of roller sets, each of which comprises a pair of rollers arranged on one said cantilever in one-to-one correspondence, wherein each roller set comprises a fixed roller and a movable roller, central axes of the fixed roller and the movable roller are respectively parallel to a central axis of the output shaft, the fixed roller is rotatably connected to the cantilever, the movable roller is slidably connected to the cantilever, and the movable roller is configured to slide along a length direction of the cantilever;
- a plurality of elastic members, each connected between one movable roller and one cantilever for pushing or drawing the movable roller toward the fixed roller;
- an air pipe, passing through the plurality of roller sets in sequence, wherein the fixed roller and the movable roller of each of the roller sets are respectively in contact with the air pipe, so that the air pipe is divided into multiple chambers, one end of the air pipe passes through the housing to communicate with an external high-pressure air source, and the other end of the air pipe passes through the housing to communicate with atmosphere; after high-pressure air enters the air pipe, the high-pressure air pulsates and expands along the air pipe, thereby pushing and pressing the roller sets of the air pipe to move, thereby driving the cantilevers to rotate around the central axis of the output shaft to output power.

According to some embodiments of the present disclosure, each of the cantilevers is provided with multiple roller sets along the length direction thereof, and the roller sets on the plurality of cantilevers at the same radius form a ring and are respectively passed through by the air pipe.

According to some embodiments of the present disclosure, when the fixed roller and the movable roller compress the air pipe at a position where they abut against the air pipe, an inside of the air pipe is sealed at this compression position, and a width of the compression position of the air pipe is less than an axial length of the fixed roller or the movable roller.

According to some embodiments of the present disclosure, an air nozzle is connected to the housing, the air nozzle is located between two ends of the air pipe and fixedly and sealedly connected to the air pipe, and two air passages are provided on both sides of the air nozzle close to the air pipe, and the two air passages are in one-to-one correspondence with the two ends of the air pipe and communicate with the two ends of the air pipe respectively; one of the air passages communicates with the external high-pressure air source through a pipeline, and the other of the air passages communicates with the atmosphere, and the fixed rollers and the movable rollers abut against the air nozzles when passing through the air nozzles.

According to some embodiments of the present disclosure, the air pipe comprises multiple sections, and the air nozzles are respectively provided between ends of two adjacent sections and fixedly and sealedly connected thereto.

According to some embodiments of the present disclosure, two pairs of arc-edged triangular plates are symmetrically provided on both sides of the air nozzle close to the air pipe, each air passage is located between the two arc-edged triangular plates of one pair of arc-edged triangular plates, the bottoms of the arc-edged triangular plates are connected to the air nozzle, and when the fixed rollers and the movable rollers pass through the air nozzle, two arc edges of the arc-edged triangular plates respectively abut against the fixed rollers and the movable rollers.

According to some embodiments of the present disclosure, two ends of the air pipe are respectively fixedly connected with mounting plates, the mounting plates are fixedly and sealedly connected with the air nozzle, the mounting plates are provided with air nozzle through holes, and the air nozzle through holes are respectively connected with the air pipe and the air passage.

According to some embodiments of the present disclosure, the cantilever is a frame, the fixed roller and the movable roller are respectively provided with roller axles, the fixed roller and the movable roller are respectively rotatably connected to the roller axles, two ends of the roller axle on the fixed roller are rotatably connected to inner walls on both sides of the frame, the inner walls on both sides of the frame are provided with sliding grooves along a length direction thereof, two ends of the roller axle on the movable roller extend into the sliding grooves and are slidably connected thereto, one end of the elastic member is connected to the frame, and the other end of the elastic member is connected to the roller axle on the movable roller.

According to some embodiments of the present disclosure, a spring stopper is connected to one end of the elastic member close to the movable roller, and an arc groove is provided on a side of the spring stopper away from the elastic member, and the arc groove abuts against the roller shaft on the movable roller.

According to some embodiments of the present disclosure, one side of the frame is disconnected between the fixed roller and the movable roller, and a connecting rib is provided inside the frame, and two ends of the connecting rib are fixedly connected to inner walls of the frame at two sides.

Compared with the prior art, the present disclosure provides a pulsating pneumatic motor, the output shaft on the housing, and the cantilevers, the fixed rollers and the movable rollers of the roller sets, the elastic members and the air pipe of the rotor assembly cooperate with each other, the air pipe is divided into multiple chambers by the fixed rollers and the movable rollers of the roller sets on each cantilever. In this way, when the air continuously enters the air pipe, each chamber is pulsatingly expanded, thereby driving the fixed roller and the movable roller pressed against each other to rotate. The tangential force of the rotating fixed roller and movable roller drives the output shaft to rotate by means of the cantilever. The high-pressure air pulsates and expands along the air pipe with a variable cross-section, thereby pushing the roller set pressing the air pipe to move, and then driving the rotor assembly to rotate for power output. The air pipe constitutes an independent air path of the pneumatic motor, which can prevent the problem of air leakage of the pneumatic motor, and at the same time avoid the mechanical energy loss caused by the friction between the moving parts and the stationary parts, thereby improving the work conversion efficiency of the pneumatic motor. The pneumatic motor of the present disclosure has high conversion efficiency, high life, strong practicality, and it is worthy for marketing application.

DETAILED DESCRIPTION OF EMBODIMENTS

Figure 1:
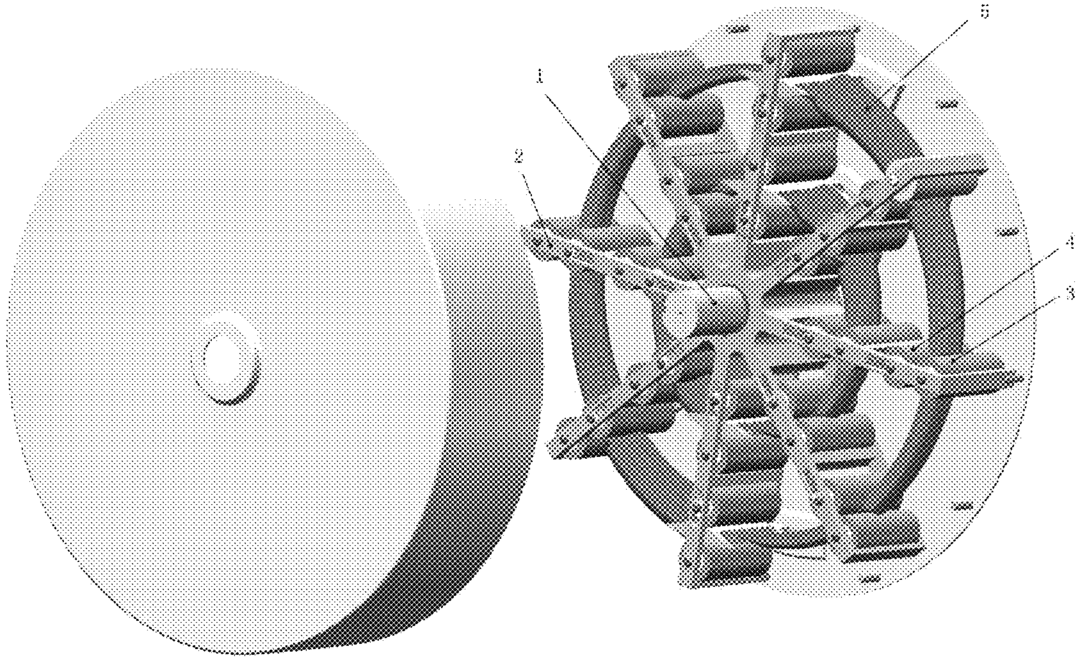
FIG. 1 is a schematic view showing the internal structure of a pulsating pneumatic motor according to an embodiment of the present disclosure.

The present disclosure provides a pulsating pneumatic motor, and it will be described below in conjunction with the schematic structural views of FIGS. 1 to 12.

In the description of the present disclosure, it should be understood that the terms "center", "longitudinal", "lateral", "length", "width", "thickness", "up", "down", "front", "back", "left", "right", "vertical", "horizontal", "top", "bottom", "inside", "outside", "axial", "radial", "circumferential" and the like indicate positions or positional relationships based on the positions or positional relationships shown in the drawings, and they are only for the convenience of describing the technical solution of the present disclosure and simplifying the description, rather than indicating or implying that the device or element referred to must have a specific orientation, be constructed and operated in a specific orientation, and therefore they cannot be understood as a limitation of the present disclosure.

A pneumatic motor refers to a power device that converts the pressure potential energy of compressed air into rotational mechanical energy. Compared with electric motors and oil motors, pneumatic motors use compressed air as the driving medium, it is easy to obtain and use the air source, and the discharge is pollution-free, the power and torque output are large, and they are widely used in many fields such as ships, metallurgy, chemical industry, automobile manufacturing, engineering machinery, aerospace, etc.

Pneumatic motors are divided into vane-type pneumatic motors, piston-type pneumatic motors, gear-type pneumatic motors, etc. according to their structures. The vane-type pneumatic motor is mainly composed of an eccentrically mounted shaft, a stator, multiple blades embedded on the shaft, and a housing. Compressed air enters the chamber between the blades from the air inlet, its working principle is to use the difference in effective area and pressure generated by the compressed air before and after the chamber between the blades, to push and rotate the blades in the direction of increasing chamber space to achieve power output. As the chamber between the blades increases, the air does work through expansion and the pressure of the air decreases. After the blades sweep across the air outlet, this part of the air completes the work and is discharged. Multiple adjacent blade chambers repeat this process continuously, resulting in continuous power output. The gear-type pneumatic motor is mainly composed of a pair of meshing gears and a housing. The meshing gears isolate the motor intake end from the exhaust end in an airtight manner. Compressed air enters the chamber from the intake end and pushes the gears to rotate in opposite directions. The compressed air is continuously transferred to the exhaust end through the movement of the tooth grooves, expands and loses pressure until it is discharged, thereby completing continuous power output. However, the chambers of the vane-type pneumatic motor are airtight through the moving contact between the stator and the blades, and the gear-type pneumatic motor is airtight through the meshing of the rotating gears. There is a certain degree of air leakage between the chambers during the operation of the motor, resulting in low power output conversion efficiency of the vane-type and gear-type pneumatic motors.

For piston-type pneumatic motors, multiple independent piston-type motors in a star-shaped layout are usually linked to work, and the air distribution valve installed at the air inlet automatically controls the intake and exhaust of each motor. A single piston-type motor consists of a motor housing, a piston, a piston ring, a connecting rod, a bearing, a return spring and other parts, and realizes power output through three processes: intake, expansion to work, and return and exhaust. However, during the operation of the piston-type motor, the mechanical energy loss caused by the friction between the piston and the motor housing is large, resulting in low power output conversion efficiency.

In summary, the existing vane-type and gear-type pneumatic motors have air leakage when working, so that part of the energy of the compressed air is wasted and cannot be converted into mechanical energy, and the piston-type pneumatic motor has friction when working, so that part of the mechanical energy converted from the energy of the compressed air needs to overcome friction to do work. Therefore, when the existing pneumatic motor performs power output conversion, part of the energy of the compressed air cannot be converted and output due to its own air leakage or the need to overcome friction to do work, resulting in a low power output conversion efficiency of the pneumatic motor.

Based on the above problems, an embodiment of the present disclosure provides a pulsating pneumatic motor, the output shaft on the housing, and the cantilevers, the fixed rollers and the movable rollers of the roller sets, the elastic members and the air pipe of the rotor assembly cooperate with each other, the air pipe is divided into multiple chambers by the fixed rollers and the movable rollers of the roller sets on each cantilever. In this way, when the air continuously enters the air pipe, each chamber is pulsatingly expanded, thereby driving the fixed roller and the movable roller pressed against each other to rotate. The tangential force of the rotating fixed roller and movable roller drives the output shaft to rotate by means of the cantilever. The high-pressure air pulsates and expands along the air pipe with a variable cross-section, thereby pushing the roller set pressing the air pipe to move, and then driving the rotor assembly to rotate for power output. The air pipe constitutes an independent air path of the pneumatic motor, which can prevent the problem of air leakage of the pneumatic motor, and at the same time avoid the mechanical energy loss caused by the friction between the moving parts and the stationary parts, thereby improving the work conversion efficiency of the pneumatic motor.

Figure 2:
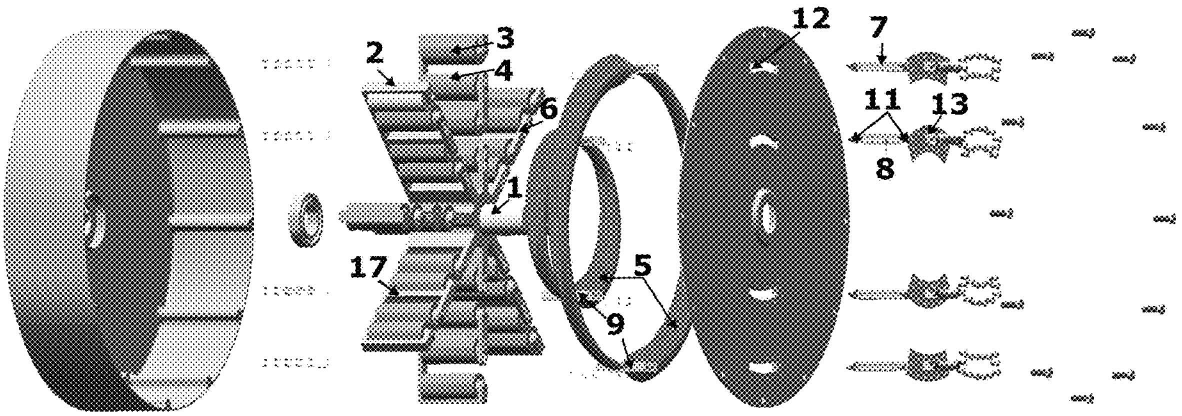
FIG. 2 is an exploded view of the pulsating pneumatic motor according to the embodiment of the present disclosure.

As shown in the figures, FIG. 1 is a schematic view showing the internal structure of a pulsating pneumatic motor according to an embodiment of the present disclosure; and FIG. 2 is an exploded view of the pulsating pneumatic motor according to the embodiment of the present disclosure. There is provided a pulsating pneumatic motor including a housing and an output shaft 1 arranged in the housing, and both ends of the output shaft 1 are rotatably connected to the housing. It also includes a rotor assembly connected to the output shaft 1 and an air pipe/air pipes 5 connected to the rotor assembly, wherein the rotor assembly includes: a plurality of cantilevers 2, which are radially and evenly spaced and fixedly connected to the output shaft 1; a plurality of roller sets, each of which comprises a pair of rollers arranged on one said cantilever 2 in one-to-one correspondence, wherein each roller set comprises a fixed roller 3 and a movable roller 4, central axes of the fixed roller 3 and the movable roller 4 are respectively parallel to a central axis of the output shaft 1, the fixed roller 3 is rotatably connected to the cantilever 2, the movable roller 4 is slidably connected to the cantilever 2, and the movable roller 4 is configured to slide along a length direction of the cantilever 2; a plurality of elastic members 6, each connected between one movable roller 4 and one cantilever 2 for pushing or drawing the movable roller 4 toward the fixed roller 3; an air pipe 5, passing through the plurality of roller sets in sequence, wherein the fixed roller 3 and the movable roller 4 of each of the roller sets are respectively in contact with the air pipe 5, so that the air pipe 5 is divided into multiple chambers, one end of the air pipe 5 passes through the housing to communicate with an external high-pressure air source, and the other end of the air pipe 5 passes through the housing to communicate with atmosphere; after high-pressure air enters the air pipe 5, the high-pressure air pulsates and expands along the air pipe 5, thereby pushing and pressing the roller sets of the air pipe 5 to move, thereby driving the cantilevers 2 to rotate around the central axis of the output shaft 1 to output power.

In this embodiment, when the external high-pressure air enters the air pipe 5, the chambers expand, thereby driving the fixed rollers 3 and the movable rollers 4 on the cantilevers 2 to rotate. The tangential force of the rotation of the fixed rollers 3 and the movable rollers 4 drives the cantilevers and the output shaft 1 to rotate. The movable rollers 4 move away from the fixed rollers 3 while rotating, so that the air enters the next chamber to continue to expand. Each chamber pulsates and expands, thereby driving the fixed rollers and the movable rollers that are pressed against each other to rotate. The tangential force of the rotation of the fixed rollers and the movable rollers drives the cantilevers and the output shaft to rotate.

Figure 3:
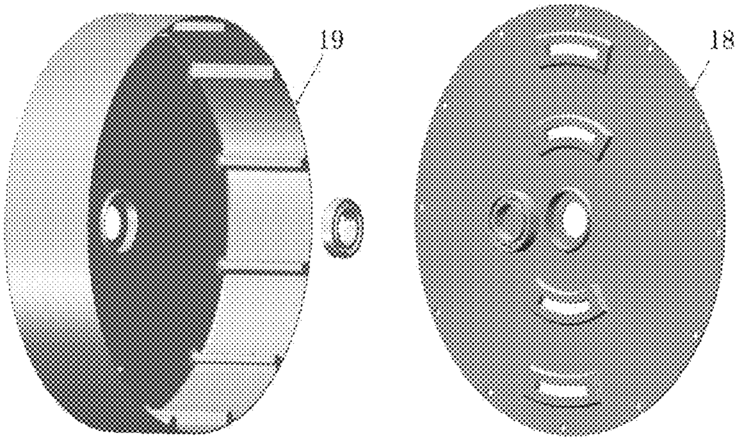
FIG. 3 is a schematic structural view of the housing of the pulsating pneumatic motor according to the embodiment of the present disclosure.

As shown in the figures, FIG. 3 is a schematic structural view of the housing of the pulsating pneumatic motor according to the embodiment of the present disclosure. The housing in this embodiment is composed of an upper cover 18, an upper cover bearing, a barrel body 19, a lower cover bearing and housing locking screws. The upper cover 18 and the barrel body 19 are provided with an output shaft through hole in the center. The upper cover 18 and the barrel body 19 are respectively provided with bearing seats on the inner side of the center of the output shaft through holes. The bearing seats are configured for the installation of the upper cover bearing and the lower cover bearing. The upper cover 18 and the barrel body 19 are coaxially installed through the output shaft 1, and the housing locking screws are respectively locked with the first screw holes on the upper cover 18 and the barrel body 19.

A connecting pipe is sleeved on the output shaft 1, and the connecting pipe is rigidly connected to the output shaft 1 through a flat key for power output. The cantilevers 2 are fixedly connected to the connecting pipe, the retaining rings installed at both ends of the output shaft 1 prevent the connecting pipe from sliding along the axial direction.

Since the blades of the vane-type pneumatic motor are connected to the central rotating shaft, the number of the blades should not be too many due to the space limitation of the central rotating shaft, which results in a small number of independent chambers. It results in a small expansion ratio of the chamber volume at the beginning of exhaust to the chamber volume at the end of intake, results in a large exhaust pressure, low pressure potential energy utilization rate and work conversion efficiency. When the gear of the gear-type pneumatic motor is a spur gear, the air does not expand in the tooth groove, and it can only be driven by the pressure difference on both sides of the spur gear, resulting in low work conversion efficiency. When using herringbone gears or helical gears, the expansion ratio of air in the tooth groove of the herringbone gear or helical gear is about 1.6, and therefore there is also a situation of high exhaust pressure, resulting in low pressure potential energy utilization rate and work conversion efficiency.

Based on this, this embodiment proposes an improved method. Optionally, each cantilever 2 is provided with multiple roller sets along its length direction. The roller sets at the same radius on multiple cantilevers 2 form a ring and are respectively passed through by the air pipe 5.

In this embodiment, multiple roller sets are provided on the cantilever 2 to achieve synchronous work conversion of multiple air pipes, further increasing the number of chambers and improving the work conversion efficiency.

Whether it is a vane-type pneumatic motor, a piston-type pneumatic motor, or a gear-type pneumatic motor, etc., the existing pneumatic motors have mechanical energy loss caused by friction during the work process.

Based on this, this embodiment proposes an improved method. Optionally, when the fixed roller 3 and the movable roller 4 compress the air pipe at a position where they abut against the air pipe 5, an inside of the air pipe 5 is sealed at this compression position, and a width of the compression position of the air pipe 5 is less than an axial length of the fixed roller 3 or the movable roller 4.

In this embodiment, the width of the compression position of the air pipe 5 is less than the axial length of the fixed roller 3 or the movable roller 4. When the air pipe pulsating expansion drives the rotor assembly to rotate, it can avoid interference friction between the air pipe 5 and the housing or the cantilevers, and further avoid mechanical energy loss caused by friction.

Figure 4:
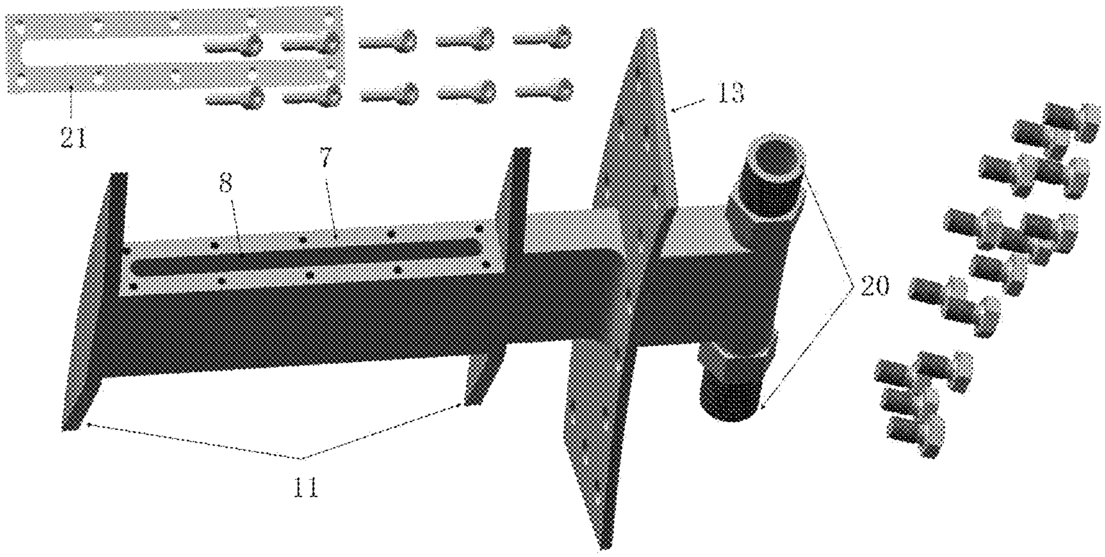
FIG. 4 is a schematic structural view of the air nozzle of the pulsating pneumatic motor according to the embodiment of the present disclosure.

As shown in the figures, FIG. 4 is a schematic structural view of the air nozzle of the pulsating pneumatic motor according to the embodiment of the present disclosure. Optionally, an air nozzle 7 is connected to the housing, the air nozzle 7 is located between two ends of the air pipe 5 and fixedly and sealedly connected to the air pipe, and two air passages 8 are provided on both sides of the air nozzle 7 close to the air pipe 5, and the two air passages 8 are in one-to-one correspondence with the two ends of the air pipe 5 and communicate with the two ends of the air pipe 5 respectively; one of the air passages 8 communicates with the external high-pressure air source through a pipeline, and the other of the air passages 8 communicates with the atmosphere, and the fixed rollers 3 and the movable rollers 4 abut against the air nozzles 7 when passing by the air nozzles.

In this embodiment, two air pipe interfaces 20 are provided at ends of the air nozzle 7 located outside the housing, and the air pipe interfaces 20 are respectively connected to the air passages 8 on the same side thereof. The air pipe interfaces 20 are used to connect to the external high-pressure air source through a pipeline or are used to exhaust.

As a further optimization scheme, in the disclosed embodiment, optionally, the air pipe 5 comprises multiple sections, and the air nozzles 7 are respectively provided between ends of two adjacent sections and fixedly and sealedly connected thereto.

In this embodiment, the air pipe 5 is formed by multiple sections of pipes, and then the air nozzle 7 is provided between the ends of adjacent sections. In this way, it can further improve the output power of the pneumatic motor.

As a further optimization scheme, in the disclosed embodiment, optionally, two pairs of arc-edged triangular plates 11 are symmetrically provided on both sides of the air nozzle 7 close to the air pipe 5, each air passage 8 is located between the two arc-edged triangular plates of one pair of arc-edged triangular plates 11, the bottoms of the arc-edged triangular plates 11 are connected to the air nozzle 7, and when the fixed rollers 3 and the movable rollers 4 pass through the air nozzle 7, two arc edges of the arc-edged triangular plates 11 respectively abut against the fixed rollers 3 and the movable rollers 4.

The arc-edged triangular plate 11 in this embodiment can make the movable roller 4 move away from the fixed roller 3, so that the fixed roller 3 and the movable roller 4 pass through the air nozzle 7 smoothly, further avoiding the mechanical energy loss caused by friction.

Figure 5:
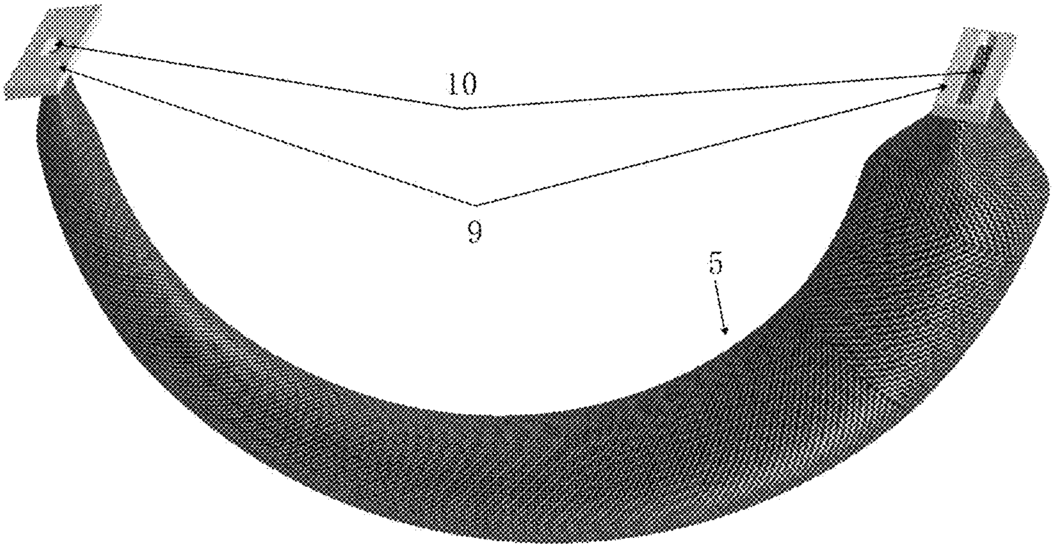
FIG. 5 is a schematic structural view of the air pipe of the pulsating pneumatic motor according to the embodiment of the present disclosure.

As shown in the figures, FIG. 5 is a schematic structural view of the air pipe of the pulsating pneumatic motor according to the embodiment of the present disclosure. Optionally, two ends of the air pipe 5 are respectively fixedly connected with mounting plates 9, the mounting plates 9 are fixedly and sealedly connected with the air nozzle 7, the mounting plates 9 are provided with air nozzle through holes 10, and the air nozzle through holes 10 are respectively connected with the air pipe 5 and the air passage 8.

In this embodiment, a plurality of second screw holes are provided in the mounting plate 9 outside the air nozzle through hole 10, a plurality of third screw holes are provided in the air nozzle 7 outside the air passage 8 at the end of the air nozzle close to the air pipe 5, and the mounting plate 9 and the air nozzle 7 are fixedly connected by air pipe connecting screws, the second screw holes and the third screw holes.

In this embodiment, an air nozzle sealing pad 21 is provided between the mounting plate 9 and the air nozzle 7, and through holes are provided on the air nozzle sealing pad 21, and the air pipe connecting screws pass through the through holes, so as to realize the sealing connection between the mounting plate 9 and the air nozzle 7.

In addition, an air nozzle through hole 12 is provided on the housing, and a connecting plate 13 is provided on the air nozzle 7, and the air nozzle 7 passes through the air nozzle through hole 12, and the connecting plate 13 is fixedly connected with the air nozzle through hole 12.

In this embodiment, the air nozzle through hole 12 is provided on the upper cover 18, and the upper cover 18 is provided with a plurality of fourth screw holes outside the air nozzle through hole 12, and a plurality of fifth screw holes are provided on the connecting plate 13, and air nozzle mounting screws are used to cooperate with the fourth screw holes and the fifth screw holes to fix the mounting plate 13.

Figure 6:
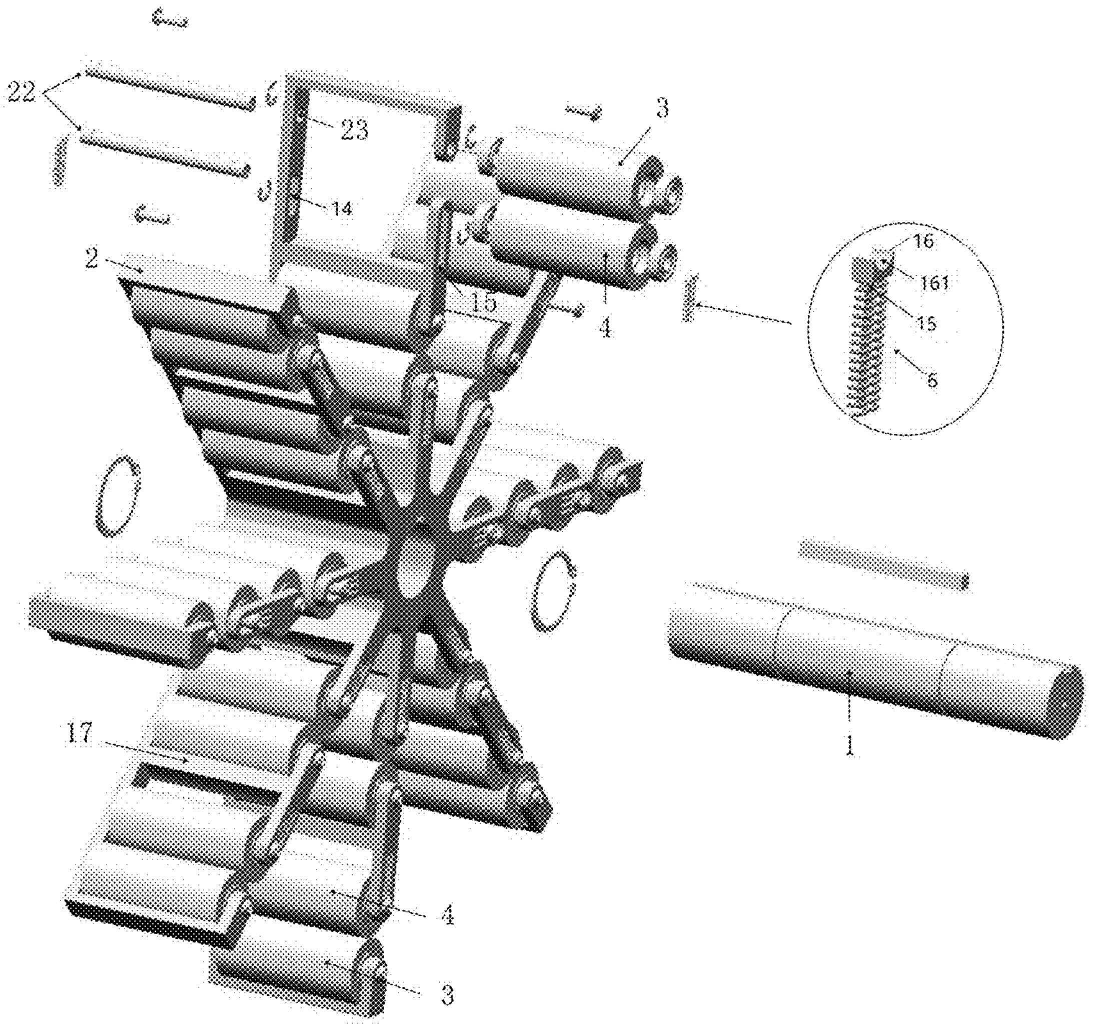
FIG. 6 is a schematic structural view of the rotor assembly of the pulsating pneumatic motor according to the embodiment of the present disclosure.

As shown in the figures, FIG. 6 is a schematic structural view of the rotor assembly of the pulsating pneumatic motor according to the embodiment of the present disclosure, optionally, the cantilever 2 is a frame, the fixed roller 3 and the movable roller 4 are respectively provided with roller axles 22, the fixed roller 3 and the movable roller 4 are respectively rotatably connected to the roller axles 22, two ends of the roller axle 22 on the fixed roller 3 are rotatably connected to inner walls on both sides of the frame, the inner walls on both sides of the frame are provided with sliding grooves 14 along a length direction thereof, two ends of the roller axle 22 on the movable roller 4 extend into the sliding grooves 14 and are slidably connected thereto, one end of the elastic member 6 is connected to the frame, and the other end of the elastic member is connected to the roller axle 22 on the movable roller 4.

In this embodiment, the cantilever 2 adopts a frame, which can not only make the fixed rollers 3 and the movable rollers 4 rotate stably and reduce the noise of the motor, but also use the sliding grooves 14 on the frame to cooperate with the roller axle 22 on the movable roller 4 to achieve sliding, this can further reduce the weight of the pneumatic motor rotor assembly and further improve the work conversion efficiency of the pneumatic motor.

In this embodiment, the fixed roller 3 and the movable roller 4 are both rotatably connected to the roller axles 22 through roller bearings. The roller axle 22 is installed with roller retaining rings to prevent the fixed roller 3 or the movable roller 4 from sliding axially. The roller axle 22 is installed with limit screws at both ends to prevent the roller from sliding or falling out during movement. The roller axle 22 on the fixed roller 3 is fixed in the circular mounting hole 23 on the cantilever 2. In order to make the fixed roller 3 only move circumferentially around the roller axle 22, the limit screws at both ends of the fixed roller 3 are tightly connected to the cantilever 2.

In this embodiment, the roller axle 22 on the movable roller 4 is installed in the sliding grooves 14 on the cantilever 2, and small gaps are left between the limit screws at both ends of the movable roller 4 and the cantilever 2 for non-tight connection.

As a further optimization scheme, in the disclosed embodiment, optionally, a spring stopper 16 is connected to one end of the elastic member 6 close to the movable roller 4, and an arc groove 161 is provided on a side of the spring stopper 16 away from the elastic member 6, and the arc groove 161 abuts against the shaft axle 22 on the movable roller 4.

In this embodiment, the elastic member 6 adopts a coil spring, and two spring seats 15 are connected to both ends of the coil spring, one of the spring seats 15 is connected to the end of the slide groove 14 away from the fixed roller 3, and the side of the other spring seat 15 away from the elastic member 6 is connected to the spring stopper 16.

In this embodiment, the limit screws at both ends of the movable roller 4 can simultaneously prevent the spring stoppers 16 from escaping from the slide grooves 14 of the cantilever 2.

As a further optimization scheme, in the disclosed embodiment, optionally, one side of the frame is disconnected between the fixed roller 3 and the movable roller 4, and a connecting rib 17 is provided inside the frame, and two ends of the connecting rib 17 are fixedly connected to inner walls of the frame at two sides.

In this embodiment, the frame is disconnected on one side between the fixed roller 3 and the movable roller 4 of the same roller set so that the air nozzle can pass through without interference when the cantilever 2 rotates, and the air pipe 5 can be easily replaced.

Figure 7:
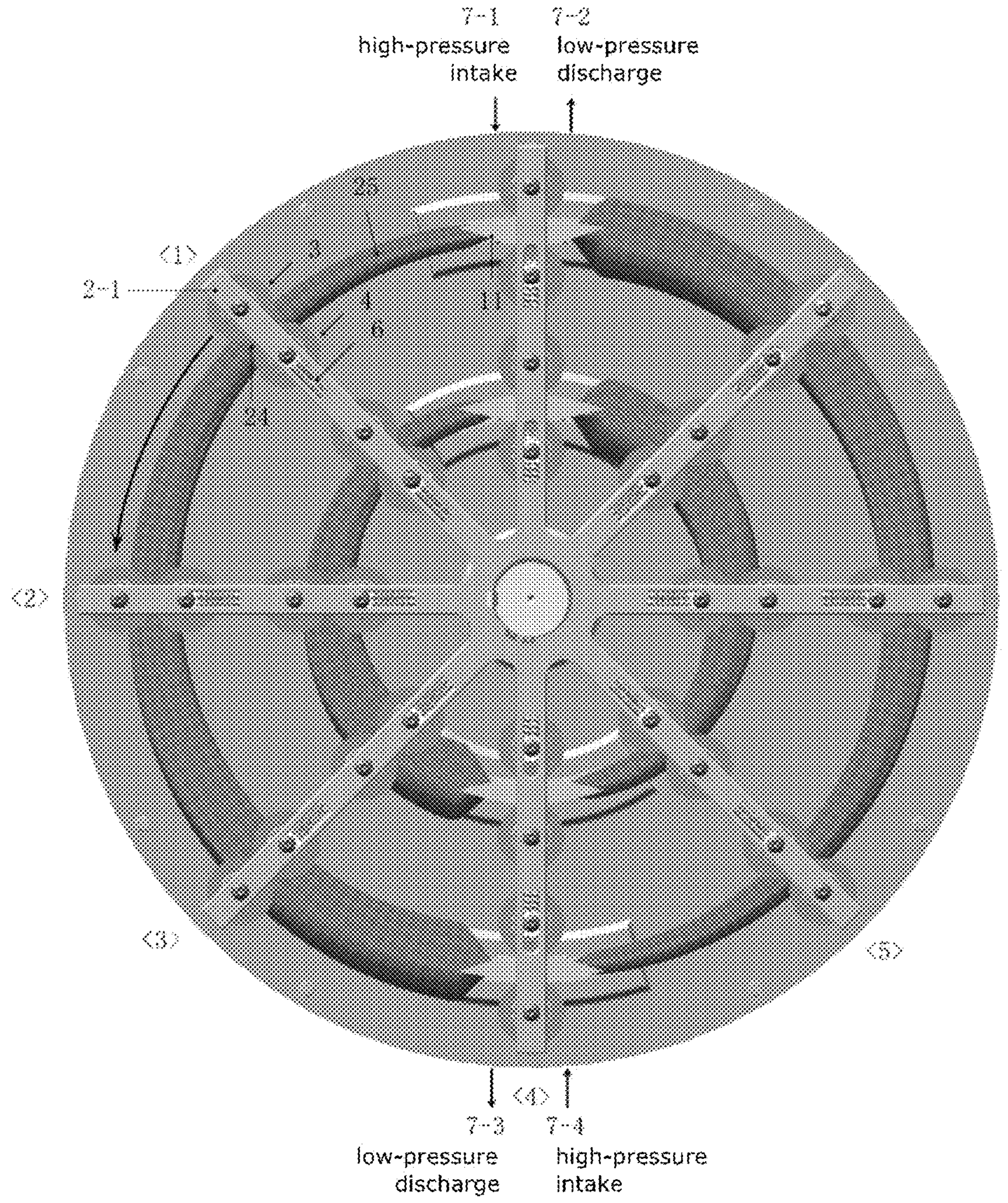
FIG. 7 is a schematic view showing the working condition of the pulsating pneumatic motor according to the embodiment of the present disclosure.

The working process of the pulsating pneumatic motor of the present disclosure is shown in FIG. 7. The pneumatic motor herein takes the structural form of symmetrical eight cantilevers, two rings, four air nozzles and the same direction air pipe as an example. The air nozzles 7-1 and 7-4 are respectively connected to the high-pressure air delivery pipe through the air pipe interfaces 20 on the air nozzles 7 to pass the high-pressure air into each air pipe 5. The air nozzles 7-2 and 7-3 are respectively communicated with the atmosphere through the air pipe interfaces 20 on the air nozzles 7 to discharge the low-pressure air after the work is completed.

Taking the cantilever 2-1 as an example to illustrate the working process, when the cantilever 2-1 is in position <1>, the movable roller 4 is under the action of the elastic member 6 and the rotating centrifugal force, the air pipe 5 is pressed against the pressing point 24 between the fixed roller 3 and the movable roller 4, so the air pipe 5 forms a chamber 25 between the pressing point 24 and the air nozzle 7-1; under the action of the pressure difference between both sides of the pressing point 24, the fixed roller 3 rolls counterclockwise and moves along the air pipe 5, and the movable roller 4 rolls clockwise and moves along the air pipe 5, thereby driving the cantilever 2-1 to rotate counterclockwise around the central axis of the output shaft.

During the rotation of the cantilever 2-1 from position <1> to position <2>, the chamber 25 is initially an isobaric chamber with a pressure equal to the intake pressure. With the formation of a closed chamber between the air nozzle 7-1 and the roller set on the subsequent cantilever, the chamber 25 is transformed into a variable pressure chamber between the cantilever 2-1 and the subsequent cantilever; since the cross-sectional area of the air pipe 5 gradually increases from position <1> to position <2>, the volume of the chamber 25 also increases uniformly with the counterclockwise rotation of the cantilever 2-1, resulting in a uniform decrease in the pressure in the chamber, but the contact area between the air pipe 5 and the roller set increases synchronously, and the pressure difference between both sides of the pressing point 24 does not decrease significantly, thereby maintaining the stability of the rotation torque of the cantilever 2-1.

When the cantilever 2-1 passes through position <2> and position <3> and approaches position <4>, the fixed roller 3 and the movable roller 4 are separated under the guidance of the arc-edged triangular plates 11, so that the roller set passes through the air nozzle 7-3 and the air nozzle 7-4 without interference; at this time, the position of the fixed roller 3 remains unchanged, and the movable roller 4 moves to the inner side of the cantilever 2-1 under the push of the arc-edged triangular plates 11, and the elastic member 6 is gradually compressed; the chamber 25 is communicated with the atmosphere through the air nozzle 7-3, and the air introduced into the chamber 25 completes the work, and is quickly exhausted through the air nozzle 7-3 under the residual pressure in the chamber and the subsequent cantilever push.

After the cantilever 2-1 continues to move counterclockwise and passes through position <4>, the movable roller 4, under the action of the elastic member 6 and the rotating centrifugal force, is guided by the arc-edged triangular plates 11 on one side of the air nozzle 7-4, and resumes the state of pressing against the air pipe 5 with the fixed roller 3, and at the same time, a new chamber is formed between the pressing point of the fixed roller 3 and the movable roller 4 and the air nozzle 7-4, and a new work cycle begins. Various cantilevers and roller assembly in FIG. 7 repeats this power cycle process in turn, providing continuous and stable power output for the motor.

The pulsating pneumatic motor of the present disclosure can also perform air compression. By maintaining the structural form of the symmetrical eight cantilevers, two rings, four air nozzles and the same direction air pipe in FIG. 7, the cantilever 2 is driven to rotate clockwise by the output shaft 1 using external power, and the connection of the air pipe interface 20 is changed at the same time, the pulsating pneumatic motor can be easily converted from the pneumatic working condition to the air compression condition.

Figure 8:
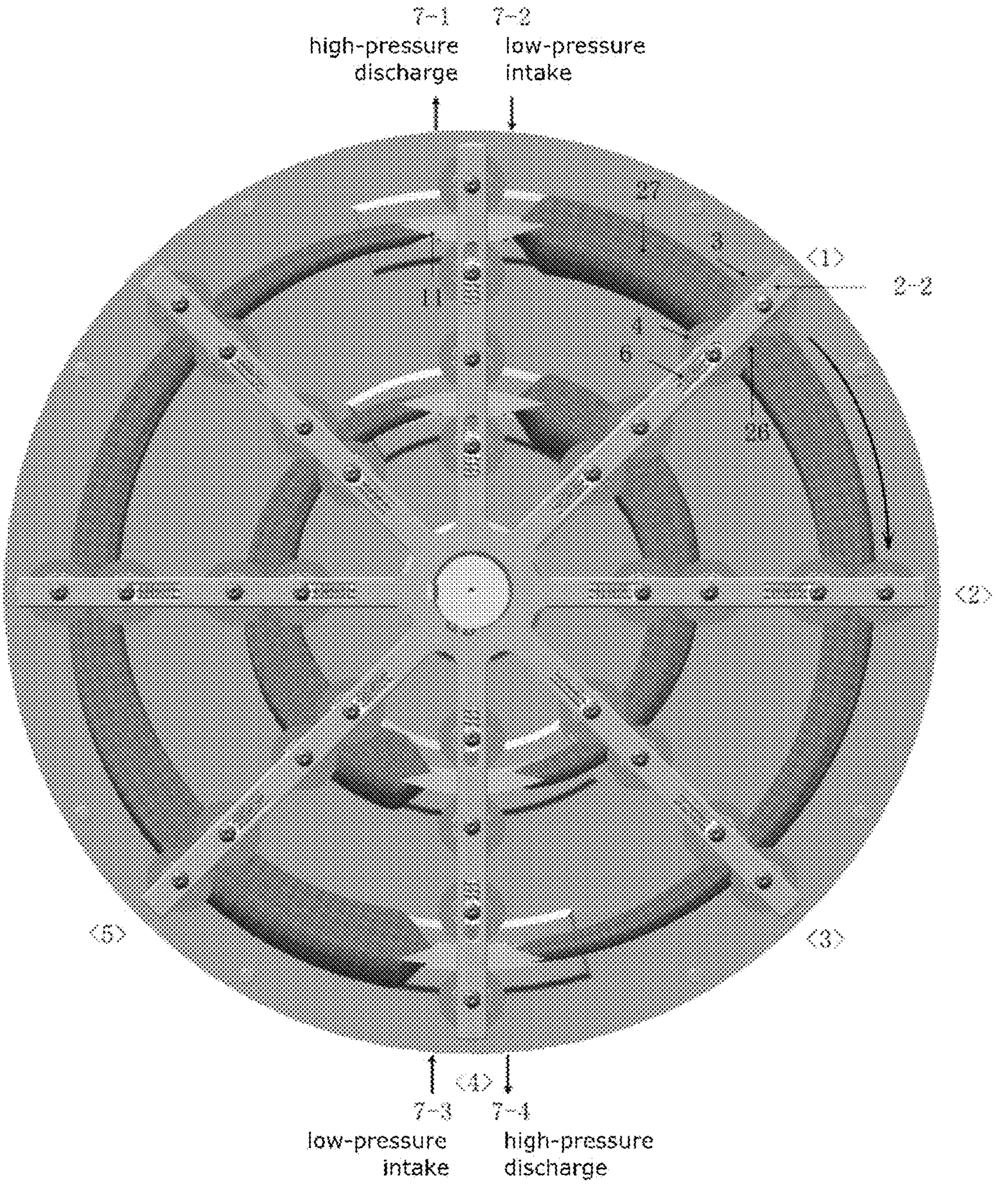
FIG. 8 is a schematic view showing the air compression condition of the pulsating pneumatic motor according to the embodiment of the present disclosure.

As shown in FIG. 8, the air nozzles 7-2 and 7-3 are respectively connected to the low-pressure air delivery pipe through the air pipe interfaces 20 connected thereto, and the low-pressure air is filled into each air pipe 5. It should be noted that since the air pipe 5 is made of flexible material, when the roller set rolls over the air pipe 5, the air pipe 5 cannot inhale external air by itself under natural conditions or the inhalation amount is too low. It is necessary to rely on external equipment to slightly pressurize the input air to ensure that the input air has a certain initial pressure so as to fill the chamber in the air pipe 5. The air nozzles 7-1 and 7-4 are respectively connected to the high-pressure air storage device through the air pipe interfaces 20 connected thereto so as to store the compressed air.

Taking the cantilever 2-2 as an example to illustrate the compression process, when the cantilever 2-2 is in position <1>, the movable roller 4, under the action of the elastic member 6 and the rotating centrifugal force, presses the air pipe 5 against the pressing point 26 between the fixed roller 3 and the movable roller 4. Therefore, when the low-pressure air is filled, a chamber 27 is formed in the air pipe 5 between the pressing point 26 and the air nozzle 7-2. When the output shaft 1 drives the cantilever 2-2 to rotate clockwise, the fixed roller 3 rolls clockwise along the air pipe 5, and the movable roller 4 rolls counterclockwise along the air pipe 5, thereby the volume of chamber 27 increases continuously. During the rotation of cantilever 2-2 from position <1> to position <2>, chamber 27 is initially an isobaric chamber with a pressure equal to the intake pressure. With the formation of a closed chamber between air nozzle 7-2 and the roller set of the subsequent cantilever, chamber 27 is transformed into a variable pressure chamber between cantilever 2-2 and the subsequent cantilever. Since the cross-sectional area of air pipe 5 gradually decreases from position <1> to position <2>, the volume of chamber 27 also decreases evenly with the clockwise rotation of cantilever 2-2, so that the pressure in the chamber increases synchronously.

When the cantilever 2-2 passes through position <2> and position <3> and approaches position <4>, the fixed roller 3 and the movable roller 4 are separated under the guidance of the arc-edge triangular plates 11. At this time, the position of the fixed roller 3 remains unchanged, but the movable roller 4 moves to the inner side of the cantilever 2-2 under the push of the arc-edge triangular plates 11, and the elastic member 6 is gradually compressed; at this time, the chamber 27 is connected to the high-pressure air storage device through the air nozzle 7-4, and the pressurized air in the chamber 27 is filled into the high-pressure air storage device through the air nozzle 7-4 under the push of the subsequent cantilever.

After the cantilever 2-2 continues to move clockwise and passes through position <4>, the movable roller 4, under the action of the elastic member 6 and the rotating centrifugal force, is guided by the arc-edge triangular plates 11 on one side of the air nozzle 7-3, and resumes the contact state with the fixed roller 3. At the same time, a new chamber is formed between the pressing point of the two rollers and the air nozzle 7-3, and a new compression cycle begins. Various cantilevers and roller set in FIG. 8 repeats this compression cycle process in turn, continuously providing high-pressure air output.

As mentioned above, the pulsating multi-purpose pneumatic motor has a flexible structural form. By adjusting the number of cantilevers, cantilever structure, number of roller sets, cross-sectional shape of air pipes, number of air pipes, number of air nozzles, and installation position of air nozzles, a pneumatic motor structure suitable for various purposes and use environments can be obtained.

Now, the form and characteristics of the cantilever, roller set, air pipe and air nozzle will be explained. The essence of the cantilever 2 is a roller frame extending around the output shaft 1. Its function is to bear the force transmission between the output shaft and the roller set, and at the same time allow the roller set to pass through the air nozzle 7 without interference. An appropriate number of cantilevers 2 help to efficiently utilize the pressure potential energy in the compressed air. However, if the number of cantilevers 2 is too small, the high-pressure air filled into the air pipe 5 may be discharged without sufficient expansion, resulting in air waste. if the number of cantilevers 2 is too large, the work efficiency of the high-pressure air cannot be further improved. Instead, the power loss increases due to too many roller sets, resulting in a decrease in output power.

The roller set consists of a fixed roller 3 and a movable roller 4. One or more roller sets can be installed on one cantilever 2 to increase the power output of the motor. When the installation space along the length direction of the cantilever 2 is limited, the power output can also be increased by pressing multiple air pipes 5 using the roller sets on the same radius, and the corresponding air nozzles 7 need to be adjusted so that multiple air pipes 5 can be connected in parallel or in an array.

Figure 9A:
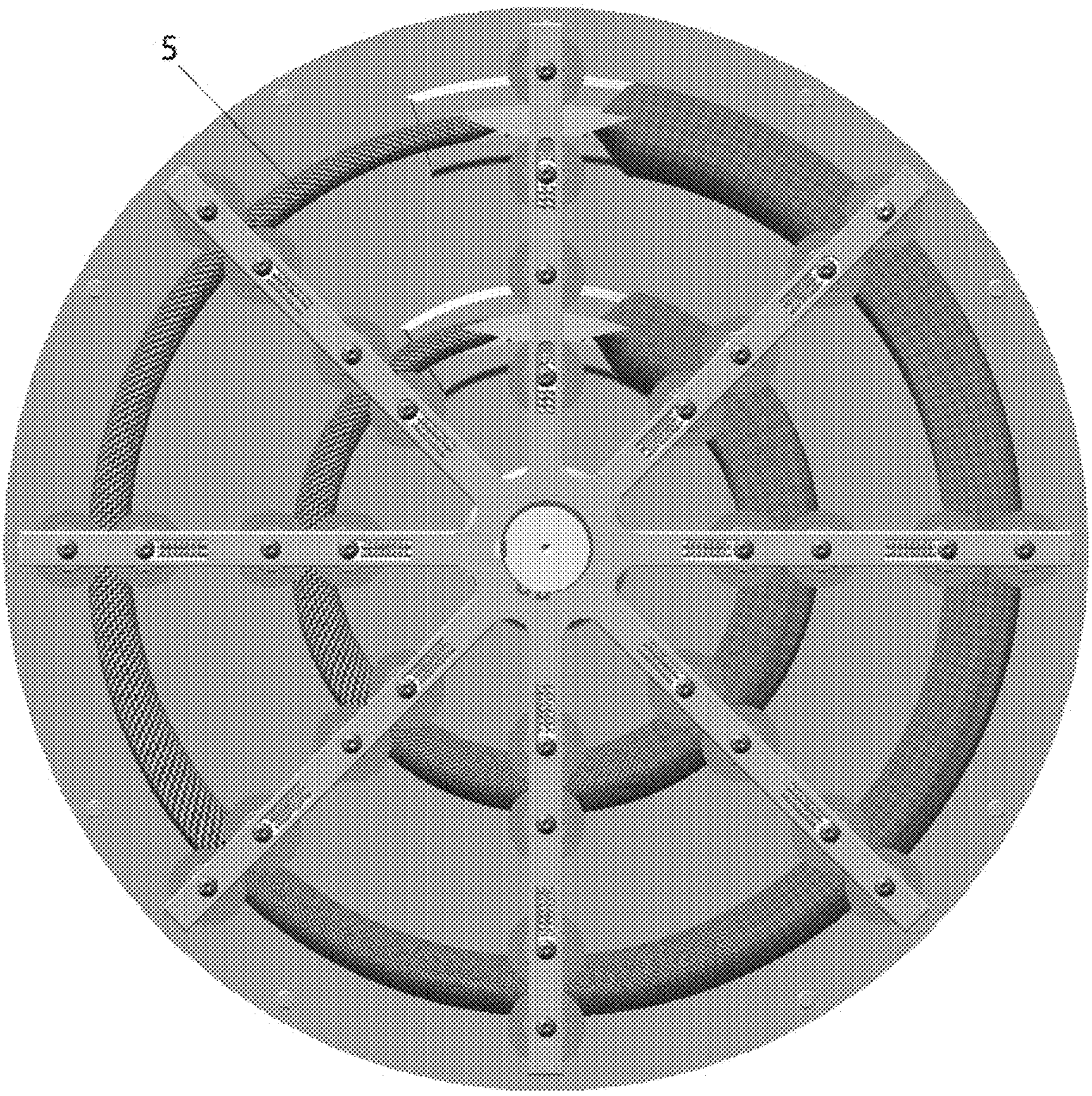
FIG. 9 is a schematic view showing the air pipe arrangement of the pulsating pneumatic motor according to the embodiment of the present disclosure, wherein a is a symmetrical two-air nozzle, same-direction air pipe structure, b is a symmetrical two-air nozzle, reverse air pipe structure, and c is an asymmetrical four-air nozzle, reverse air pipe structure.
Figure 9B:
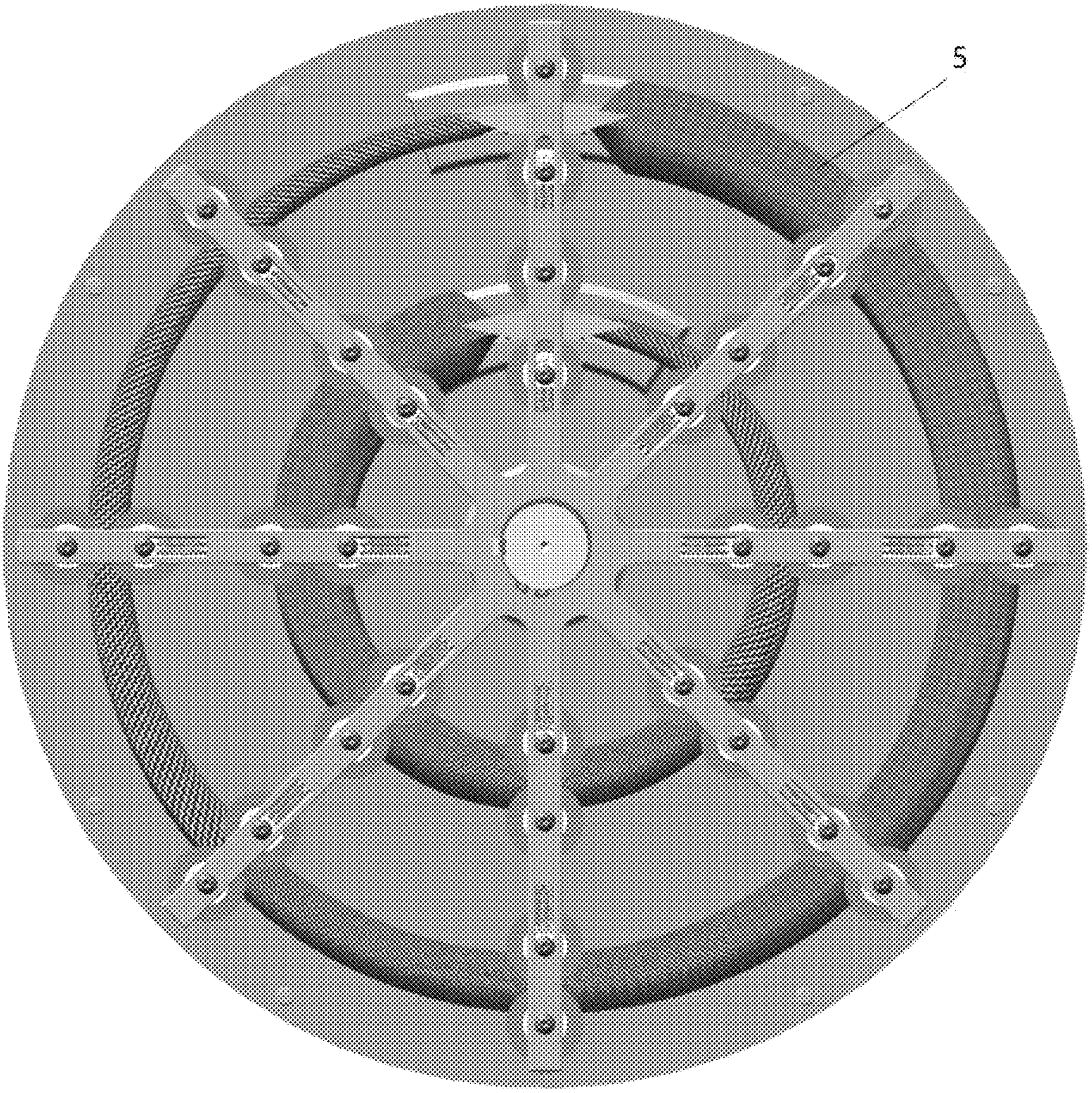
Figure 9C:
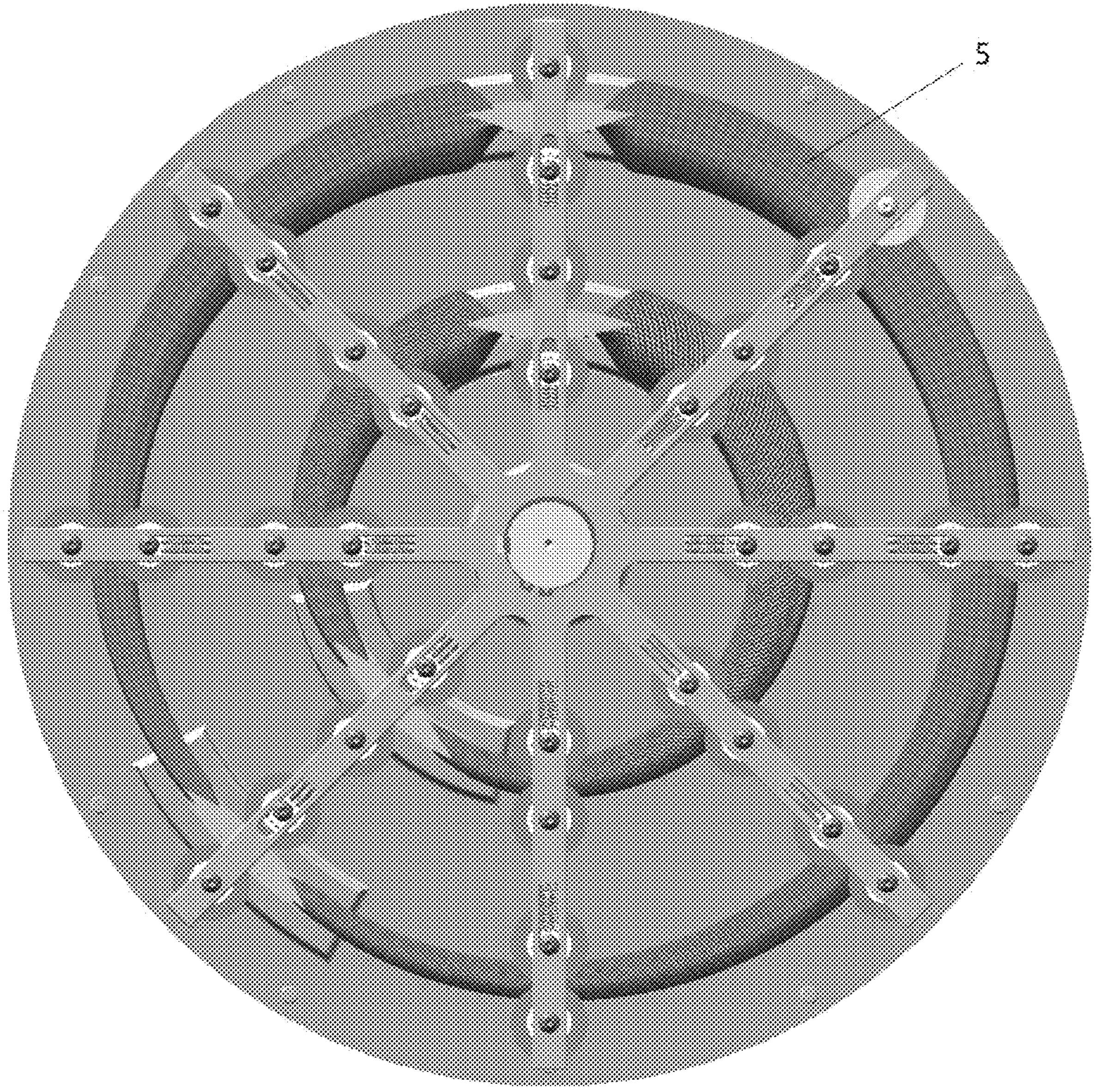

The air pipe 5 is a flexible pipe with a linear or nonlinear increase in cross-sectional area or plane width. It must have the characteristics of sealing, pressure resistance, wear resistance, low elongation, wide operating temperature range, and good heat transfer performance. It can be made of fiber reinforced materials such as flexible lining polyurethane, such as carbon fiber and polyester fiber. The cross-sectional shape of the air pipe can be any regular or irregular shape and can be changed. The design of the air pipe 5 has high flexibility and largely determines the expansion ratio of the air work. When the air pipe 5 is compressed by the fixed roller 3 and the movable roller 4, the width of the air pipe 5 is less than the axial length of the fixed roller 3 or the movable roller 4. Since the air pipe 5 is a relatively independent component, except for the shape of the air nozzle 7, the structural shape of the air pipe 5 is not affected by other components of the motor. The installation direction of the air pipe 5 can be freely adjusted according to the purpose of the motor. As shown in FIGS. 7, 8, and 9*a*, the installation form of the same-direction air pipes is suitable for a single-function purpose that only performs pneumatic work or air compression, such as engineering machinery, air compressor, etc.; the installation form of the reverse air pipes is shown in FIGS. 9*b* and 9*c*, it is suitable for pneumatic work conditions, and air compression operation or the opposite use condition are required at the same time, such as motor vehicle driving, etc. Along the rotation direction of the output shaft, different air pipes can be installed in the same direction, that is, the cross-sectional areas or plane widths of the air pipes are all gradually increased or gradually decreased, or they can be installed in opposite directions, that is, the changes of the cross-sectional areas or plane widths of the air pipes are opposite.

The air nozzle 7 is a connecting component between the air pipe 5 and the external high-pressure air source. Its number and installation form are related to the design purpose of the motor. The layout form of the air nozzle is relatively flexible. One air nozzle may be set on each air pipe 5, as shown in FIGS. 9*a* and 9*b*, or multiple air nozzles are set on each air pipe 5. The multiple air nozzles on the air pipe 5 can be arranged symmetrically or asymmetrically, as shown in FIGS. 7, 8, and 9*c*. The arrangement form of the air nozzles on multiple air pipes 5 can be the same or different.

The pulsating pneumatic motor of the present disclosure uses high-pressure air to expand along the variable-section air pipe, thereby driving the roller sets that press the air pipe to move, and then driving the cantilevers and the output shaft to rotate for power output. It can also use external power input to drive the output shaft to rotate, thereby driving the roller sets to squeeze the air pipe and move along the air pipe, compressing the low-pressure air in the air pipe into high-pressure air for output. The pulsating pneumatic motor of the present disclosure can be used for high-pressure air expansion and work conditions, can be used for input power for air compression, and can also be used for both expansion work and air compression conditions.

The pulsating pneumatic motor of the present disclosure uses the air pipe to form an independent air path. The air pulsating expansion in the air pipe drives the rollers that are pressed against each other to move, thereby driving the output shaft to rotate for output power, solving the problems of low work efficiency and high air consumption caused by air leakage in traditional pneumatic motors. Since the transmission of compressed air is limited to the closed air pipe, there is no need to consider the airtight sealing problem of the moving parts. At the same time, the sliding friction contact between the main active parts and the stationary parts is eliminated, and the sliding friction contact is replaced by rolling contact, which improves the reliability and service life of the motor and greatly reduces mechanical noise.

The variable cross-section air pipe design in the present disclosure makes the space and expansion ratio of air work not constrained by the mechanical structure of the housing and the output shaft to a certain extent, thereby improving the utilization rate of pressure potential energy and work efficiency.

The cantilevers, roller sets, air nozzles, air pipes, etc. in the present disclosure have a flexible combination form, it is easy to achieve high-power and high-torque output, or it can take into account pneumatic output and air compression recovery, or it may be simply used for multi-stage air compression, therefore it has a wide range of applications.

The pulsating pneumatic motor of the present disclosure has the advantages of simple structure, light weight, high torque, overload protection, convenient steering, high safety, etc. At the same time, the work efficiency is greatly improved, the air consumption is small, the airflow and mechanical noise are reduced, and the service life and reliability are greatly increased. In addition, the motor structure design is flexible, it is easy to expand the power or function, and it has a wide range of applications.

The pulsating pneumatic motor of the present disclosure can provide a reliable power source for pneumatic machinery and tools through a simple pipeline connection. Taking the structure of the eight-cantilever two-ring, four-nozzle, reverse air pipe as an example, as shown in FIG. 10*a*, the air compressor 28 outputs high-pressure air through the pipeline, the valve 29 and the control valve 30 in sequence. The control valve 30 is a one-in and two-out structure, which can control the high-pressure air to flow out from only one outlet at one time; the two outlets of the control valve 30 are each connected to a Y-type three-way part, the outlets of the Y-type three-way parts are respectively connected to the air pipe interfaces 20 of the pneumatic motor, that is, the upper outlets are connected to the air nozzles 7-1 and 7-5 respectively, and the lower outlets are connected to the air nozzles 7-2 and 7-6 respectively. The air nozzles 7-3, 7-4, 7-7 and 7-8 are exhaust ports. When the upper outlets of the control valve 30 are communicated, the high-pressure air enters the left air pipes of the inner ring and outer ring of the motor through the air nozzles 7-1 and 7-5 respectively, and drives the roller sets and the output shaft to rotate in the counterclockwise direction. Because there is no air input to the right air pipes, they are always in a flat state under the rolling of the roller sets, and will not cause significant power consumption.

As shown in FIG. 10*b*, when reverse rotation is required, it is only necessary to adjust the control valve 30 so that the lower outlets are open and the upper outlets are closed, and the high-pressure air enters the right air pipes of the inner ring and outer ring of the motor through the air nozzles 7-2 and 7-6 respectively, drives the roller sets and the output shaft to rotate in the clockwise direction, while the left air pipes are in a flat state due to no air input.

Figure 10:
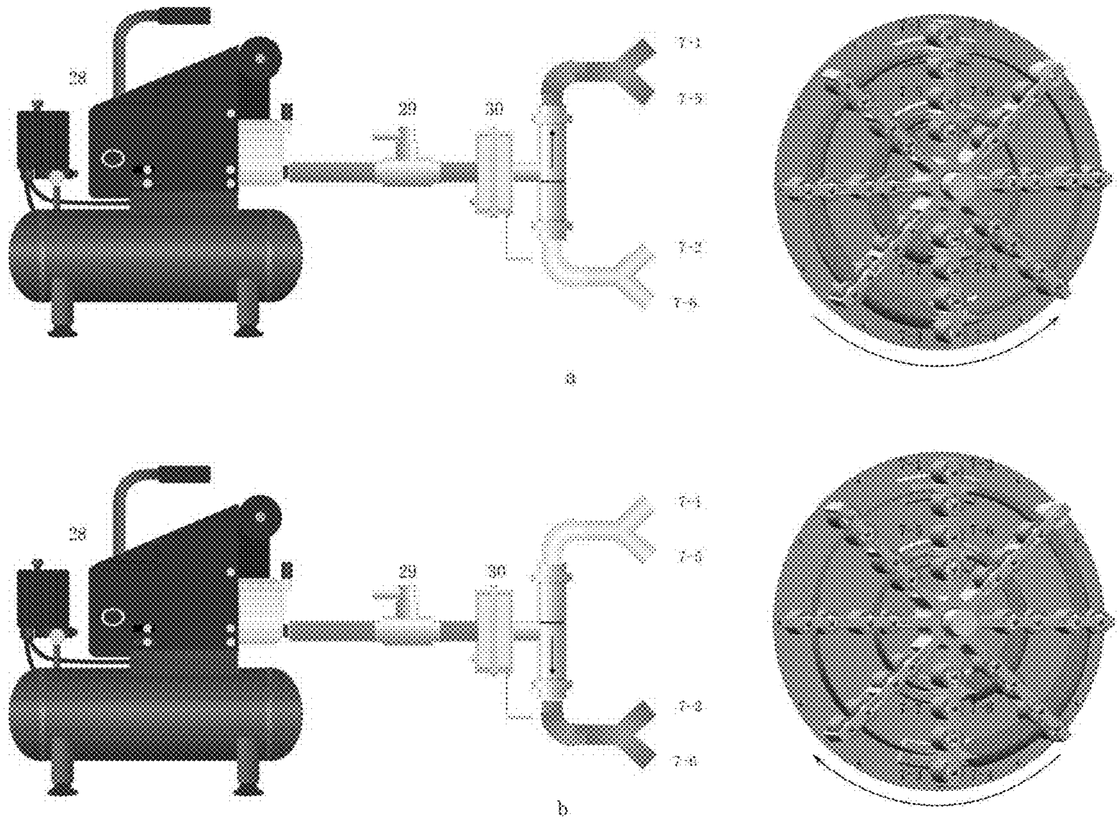
FIG. 10 is a schematic view showing the motor operation according to the embodiment of the present disclosure.

The symmetrical air nozzle and air pipe arrangement in FIG. 10 can enable the pneumatic motor to obtain exactly the same power and torque when rotating forward and reverse, but the output shaft only works within half a cycle, and the motor has an unbalanced force. For this reason, the asymmetric four-air nozzle, reverse air pipe structure in FIG. 9*c* or the symmetrical two-air nozzle, reverse air pipe structure in FIG. 9*b* can also be used for motor design.

Multi-Stage Air Compressor

Figure 11:
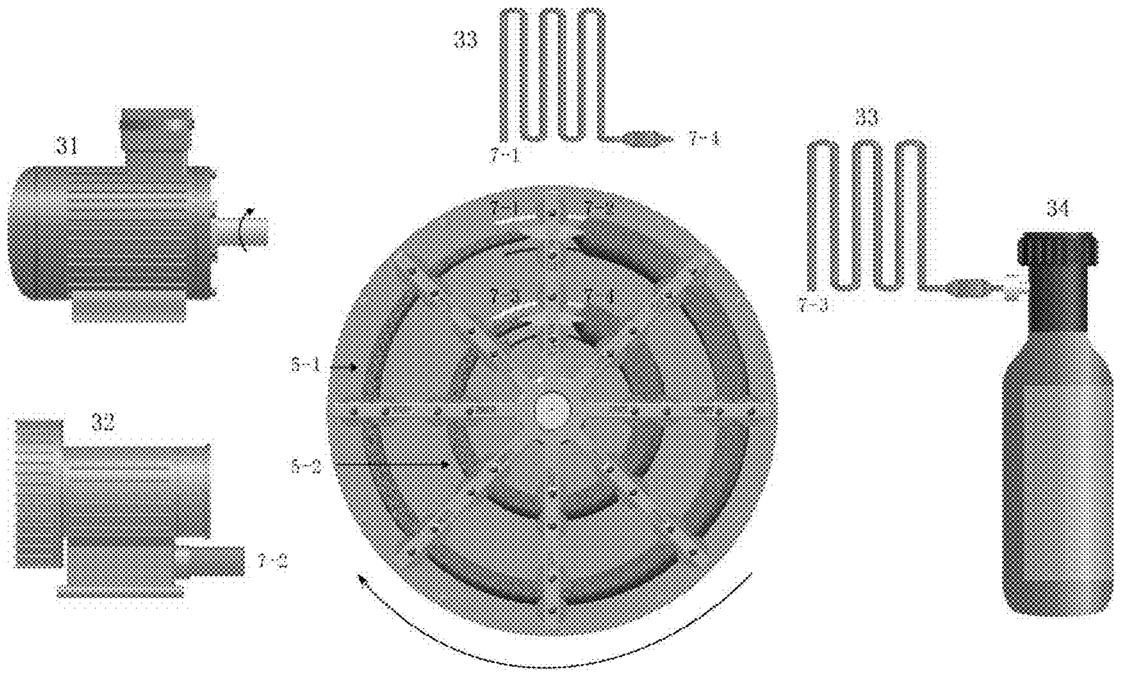
FIG. 11 is a schematic view showing the compressor operation according to the embodiment of the present disclosure.

Taking the structural layout of eight-cantilever, two-ring, two-air nozzle, same-direction air pipe as an example, the application of a pulsating multi-purpose pneumatic motor working in a two-stage air compression condition is explained. As shown in FIG. 11, the motor 31 provides power output and drives the turbine fan 32 and the motor to rotate clockwise at the same time. The turbine fan 32 outputs low-pressure air to the air nozzle 7-2, and the roller sets rotates clockwise to further compress the air in the outer ring air pipe 5-1. The high-pressure air is output through the air nozzle 7-1, cooled and dried by the radiator 33, and then sent to the inner ring air pipe 5-2 through the air nozzle 7-4 for secondary compression. The air after secondary compression is output through the air nozzle 7-3, cooled and dried by the radiator 33, and then passed into the high-pressure air tank 34.

Pneumatic Car Engine

Pneumatic cars powered by compressed air are one of the development directions of new energy vehicles. However, due to the shortcomings of low efficiency, high air consumption, high noise and vibration of existing pneumatic motors, the development of pneumatic cars powered by pneumatic motors is very slow. The pulsating multi-purpose pneumatic motor of the present disclosure has the advantages of high energy conversion efficiency, low noise and vibration, and therefore it is very suitable for pneumatic car engines. Taking the structural layout of the eight-cantilever, two-ring, two-air nozzle, reverse air pipe as an example, the application scenario of the pneumatic car engine is explained.

Figure 12:
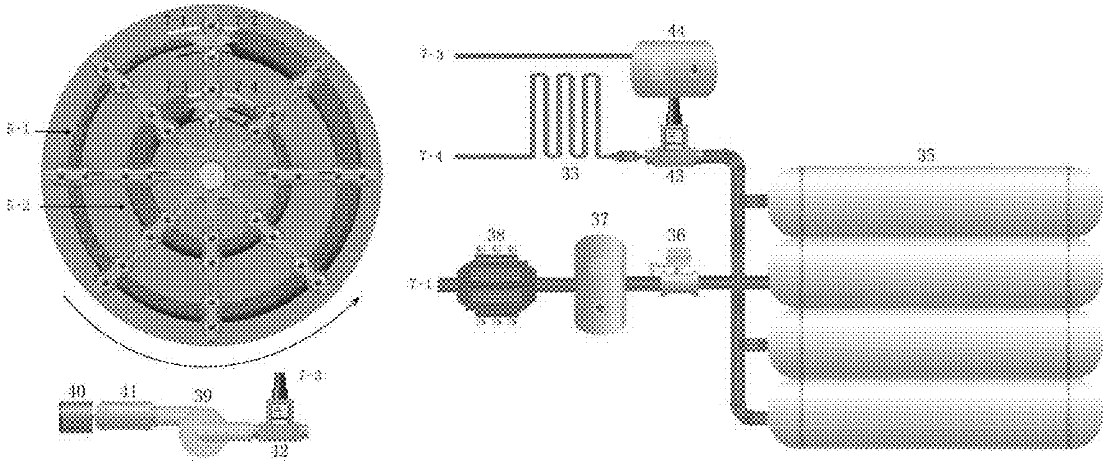
FIG. 12 is a schematic view showing the automobile engine operation according to the embodiment of the present disclosure.

As shown in FIG. 12, high-pressure air is stored in a high-pressure air tank group 35, with an air pressure of 30~35 MPa, and it is connected to a working tank 37 with an air pressure of 0.7~1.2 MPa through a pressure reducing valve 36. After stepping on the accelerator pedal of the car, the central controller 38 passes the high-pressure air in the working tank 37 into the air nozzle 7-1, and the air in the air pipe 5-1 expands and works to drive the engine to rotate counterclockwise. The engine power drives the vehicle forward through the transmission system, and the air after work is discharged into the atmosphere through the air nozzle 7-2. The engine is also connected to the fan 39 to drive it to rotate. One end of the fan 39 sucks air through the air filter 40 and the dryer 41 in turn, and the other end is connected to the air path control valve 42. When the pneumatic car accelerates, the low-pressure air flowing through the air path control valve 42 is directly discharged or used for heat dissipation of other parts of the car. At this time, the inner ring air pipe 5-2 is in a flattened state due to no air input; when the brake pedal is stepped on, the low-pressure air flowing through the control valve 42 enters the air nozzle 7-3 and enters the air pipe 5-2. While the inertia of the car drives the engine to rotate, the air in the air pipe 5-2 is compressed for energy recovery, and at the same time, a braking force is generated on the car. The compressed air enters the radiator 33 through the air nozzle 7-4 for cooling and drying, and then enters the recovery control valve 43. The recovery control valve 43 determines the air pressure value. If it is higher than the air pressure of the high-pressure air tank group 35, the compressed air is discharged into the high-pressure air tank group 35, otherwise it is discharged into the recovery tank 44. When the air pressure of the recovery tank 44 reaches the rated limit pressure, the central controller 38 will adjust the air flow direction of the air path control valve 42 so that it is directly discharged or used for heat dissipation. At the same time, the air in the recovery tank 44 is passed into the air pipe 5-2 through the air nozzle 7-3 for secondary pressurization so as to directly supplement the high-pressure air tank group 35. As the air pressure of the recovery tank 44 decreases, the central controller 38 determines if the air pressure of the recovery tank 44 is still unable to replenish the high-pressure air tank group 35 after secondary compression, if so, the air output of the recovery tank 44 will be closed, and the low-pressure air of the air path control valve 42 will be passed into the air pipe 5-2 for compression again, and the air recovery operation will be performed reciprocatingly. Pneumatic vehicles can use two ways of reversing, one is to connect the engine output to the reverse gear for reversing, and the other is to pass the high-pressure air in the working tank 37 into the air nozzle 7-4 through the central controller 38, and use the inner ring air pipe 5-2 to do work for reversing.

Using a pulsating multi-purpose pneumatic motor as the engine to drive the car has the advantages of environmental protection, high energy conversion efficiency, low noise and vibration, etc., and it has a high energy recovery efficiency, and provides safe braking for the car while recovering air.

The above disclosure only relates to optional specific embodiments of the present disclosure, but the embodiments of the present disclosure is not limited to this, and any changes that can be thought of by a person skilled in the art should fall within the scope of protection of the present disclosure.

What is claimed is:

1. A pulsating pneumatic motor, comprising a housing and an output shaft (1) disposed in the housing, wherein both ends of the output shaft (1) are rotatably connected to the housing, and wherein the pulsating pneumatic motor further comprises a rotor assembly connected to the output shaft (1), wherein the rotor assembly comprises:

a plurality of cantilevers (2), which are radially and evenly spaced and fixedly connected to the output shaft (1);

a plurality of roller sets, each of which comprises: a pair of rollers arranged on one said cantilever (2) in one-to-one correspondence, wherein each roller set comprises: a fixed roller (3) and a movable roller (4), central axes of the fixed roller (3) and the movable roller (4) are respectively parallel to a central axis of the output shaft (1), the fixed roller (3) is rotatably connected to the respective cantilever (2), the movable roller (4) is slidably connected to the respective cantilever (2), and the movable roller (4) is configured to slide along a length direction of the respective cantilever (2);

a plurality of elastic members (6), each connected between one said movable roller (4) and one said cantilever (2) for pushing or drawing the respective movable roller (4) toward the respective fixed roller (3);

an air pipe (5), passing through the plurality of roller sets in sequence, wherein the fixed roller (3) and the movable roller (4) of each of the roller sets are respectively in contact with the air pipe (5), so that the air pipe (5) is divided into multiple chambers, one end of the air pipe (5) passes through the housing to communicate with an external high-pressure air source, and the other end of the air pipe (5) passes through the housing to communicate with atmosphere;

after high-pressure air enters the air pipe (5), the high-pressure air pulsates and expands along the air pipe (5), thereby pushing and pressing the roller sets to move, thereby driving the cantilevers (2) to rotate around the central axis of the output shaft (1) to output power.

2. The pulsating pneumatic motor according to claim 1, wherein each of the cantilevers (2) is provided with multiple roller sets along the length direction thereof, and the roller sets on the plurality of cantilevers (2) at the same radius form a ring and are respectively passed through by the air pipe (5).

3. The pulsating pneumatic motor according to claim 1, wherein when the respective fixed roller (3) and the respective movable roller (4) compress the air pipe at a position where they abut against the air pipe (5), an inside of the air pipe (5) is sealed at this compression position, and a width of the compression position of the air pipe (5) is less than an axial length of the respective fixed roller (3) or the respective movable roller (4).

4. The pulsating pneumatic motor according to claim 1, wherein an air nozzle (7) is connected to the housing, the air nozzle (7) is located between two ends of the air pipe (5) and fixedly and sealedly connected to the air pipe, and two air passages (8) are provided on both sides of the air nozzle (7) close to the air pipe (5), and the two air passages (8) are in one-to-one correspondence with the two ends of the air pipe (5) and communicate with the two ends of the air pipe (5) respectively; one of the air passages (8) communicates with the external high-pressure air source through a pipeline, and the other of the air passages (8) communicates with the atmosphere, and the fixed rollers (3) and the movable rollers (4) abut against the air nozzle (7) when passing by the air nozzle.

5. The pulsating pneumatic motor according to claim 4, wherein the air pipe (5) comprises multiple sections, and multiple air nozzles (7) are respectively provided between ends of two adjacent sections of the multiple sections and fixedly and sealedly connected thereto.

6. The pulsating pneumatic motor according to claim 4, wherein two pairs of arc-edged triangular plates (11) are symmetrically provided on both sides of the air nozzle (7) close to the air pipe (5), each air passage (8) is located between the two arc-edged triangular plates of one pair of arc-edged triangular plates (11), the bottoms of the arc-edged triangular plates (11) are connected to the air nozzle (7), and when the fixed rollers (3) and the movable rollers (4) pass by the air nozzle (7), two arc edges of the arc-edged triangular plates (11) respectively abut against the fixed rollers (3) and the movable rollers (4).

7. The pulsating pneumatic motor according to claim 4, wherein the two ends of the air pipe (5) are respectively fixedly connected with mounting plates (9), the mounting plates (9) are fixedly and sealedly connected with the air nozzle (7), the mounting plates (9) are provided with air nozzle through holes (10), and the air nozzle through holes (10) are respectively connected with the air pipe (5) and the air passage (8).

8. The pulsating pneumatic motor according to claim 1, wherein each cantilever (2) is a frame, the fixed rollers (3) and the movable rollers (4) are respectively provided with roller axles (22), two ends of the roller axle (22) on the respective fixed roller (3) are rotatably connected to inner walls on both sides of the frame, the inner walls on both sides of the frame are provided with sliding grooves (14) along a length direction thereof, two ends of the roller axle (22) on the respective movable roller (4) extend into the sliding grooves (14) and are slidably connected thereto, one end of each elastic member (6) is connected to the frame, and another end of each elastic member is connected to the roller axle (22) on the respective movable roller (4).

9. The pulsating pneumatic motor according to claim 8, wherein a spring stopper (16) is connected to one end of each elastic member (6) close to the respective movable roller (4), and an arc groove (161) is provided on a side of each spring stopper (16) away from the respective elastic member (6), and each arc groove (161) abuts against the roller axle (22) on the respective movable roller (4).

10. The pulsating pneumatic motor according to claim 8, wherein one side of the frame is disconnected between the respective fixed roller (3) and the respective movable roller (4), and a connecting rib (17) is provided inside the frame, and two ends of the connecting rib (17) are fixedly connected to inner walls of the frame at two sides.

* * * * *